United States Patent [19]

Plamthottam et al.

[11] Patent Number: 5,244,962
[45] Date of Patent: Sep. 14, 1993

[54] OLEFIN POLYMER BASED PRESSURE-SENSITIVE ADHESIVES

[75] Inventors: Sebastian S. Plamthottam, Upland; Roger H. Mann, Corona del Mar; John O. Landers, Duarte, all of Calif.

[73] Assignee: Avery Dennison Corporation, Pasadena, Calif.

[21] Appl. No.: 746,145

[22] Filed: Aug. 14, 1991

Related U.S. Application Data

[63] Continuation of Ser. No. 445,188, Dec. 1, 1989, abandoned.

[51] Int. Cl.$^5$ .................. C09J 11/08; C09J 109/00; C09J 123/26
[52] U.S. Cl. .................... 524/525; 524/528; 524/533; 524/576; 524/580; 524/581; 524/583; 522/74; 522/121; 522/122; 522/127; 522/149
[58] Field of Search ............... 524/570, 576, 580, 581, 524/583, 531, 533, 525, 528, 576, 580, 581, 583; 522/74, 121, 122, 127, 149

[56] References Cited

U.S. PATENT DOCUMENTS

| | | | |
|---|---|---|---|
| 3,974,129 | 8/1976 | De La Mare | 522/149 |
| 4,483,951 | 11/1984 | Brenner | 524/533 |
| 4,707,397 | 11/1987 | Morimura et al. | 428/462 |
| 4,839,422 | 6/1989 | McElrath et al. | 525/327.4 |
| 4,855,335 | 8/1989 | Neperud | 524/505 |

FOREIGN PATENT DOCUMENTS 0011474 5/1980 European Pat. Off.

Primary Examiner—Joseph L. Schofer
Assistant Examiner—R. H. Delmendo
Attorney, Agent, or Firm—Christie, Parker & Hale

[57] ABSTRACT

There are provided pressure-sensitive adhesives which comprise free radical cured mixtures of at least one crosslinkable olefin polymer and at least one tackifying organic additive, preferably a hydrogenated additive, which is substantially nonresponsive to action of free radicals and present in an amount sufficient to tackify the cured mixture of polymer and additive.

25 Claims, No Drawings

# OLEFIN POLYMER BASED PRESSURE-SENSITIVE ADHESIVES

This is a continuation of application Ser. No. 07/445,188, filed Dec. 01, 1989, abandoned.

BACKGROUND OF THE INVENTION

The present invention is directed to multicomponent pressure-sensitive adhesives based on crosslinkable olefin polymers, which enter into free radical initiated crosslinking reactions to enhance adhesive performance in admixture with compatible tackifying additives. The preferred polymers provide pendant groups having olefinic unsaturation.

Properties of unsaturated pressure sensitive adhesive compositions can be improved by use of actinic radiation, such as ultraviolet (UV) radiation; electron beam (EB) radiation; and chemical or thermal cure. Normally, the adhesive is applied to a facestock and/or a release liner and subjected to a suitable curing action to improve adhesive properties.

One means of cure is electron beam (EB) radiation. While the facestock and/or release liner can sustain electron beam dosages up to a certain level, e.g., 80 to 100 kiloGray (kGy), going beyond that level can result in degradation of components of adhesive label and tape constructions such as the face stock and/or release liner and/or adverse reactions between the adhesive and the silicon release agent of the release liner.

Increased radiation requirements, whether EB or actinic, will reduce the speed at which an adhesive coated substrate can pass under the radiating surface or increase the required number of radiating surfaces. Both are costly.

Ethylene-propylene based pressure sensitive adhesives have not found wide use in the adhesive industry. European Patent Publication 178062 assigned to Uniroyal Co. disclosed a pressure sensitive adhesive based on ethylene propylene thermoplastic elastomer comprising crystalline polypropylene sequences and amorphous ethylene-propylene sequences along the chain. Such polymers are claimed to have good balance of peel, shear and tack properties.

European Patent Publication 254002 to Takao et al disclosed a pressure sensitive adhesive with enhanced tack comprising an elastomer, tackifier and low molecular weight ethylene-propylene copolymer obtained by oxidative degradation.

U.S. Pat. No. 4,756,337 assigned to Royston Labs Inc. disclosed a tackified ethylene propylene pressure sensitive adhesive tape for sealing gas pipe lines.

The present invention is directed to pressure-sensitive adhesives based on tackified olefin polymers which utilize free radical cure to achieve a positive modification in a pressure sensitive adhesive. The pressure sensitive adhesives are formed of at least two components, one a crosslinkable olefin polymer component preferably providing pendant groups having olefinic unsaturation and another mutually compatible organic tackifying component, preferably one which minimizes the energy requirements to achieve cure or crosslinking of the olefin polymer.

SUMMARY OF THE INVENTION

According to the present invention, there are provided pressure-sensitive adhesive compositions which comprise, in combination, at least one crosslinkable olefin polymer, preferably an olefin polymer providing at least one pendant olefinically unsaturated group, which olefin polymer is capable of undergoing gel forming reactions in the presence of free radicals preferably generated by actinic radiation or electron beam radiation, and at least one compatible tackifying organic additive, preferably a substantially hydrogenated tackifying organic additive. The tackifying organic additive is at least dispersable and preferably soluble in the olefin polymer. The combination upon cure preferably has a glass transition temperature of at least 10° C. preferably at least 20° C. below use temperature, and preferably has a glass transition temperature of from about −20° to about −100° C. The pressure-sensitive adhesive compositions of this invention display superior adhesion to low-surface energy substrates and excellent weatherability.

With cure, gel content increases with a positive change in properties such as elevated temperature shear. With the preferred substantially hydrogenated tackifying organic additive, this occurs at substantially lower levels of free radical generation than would have been required were the tackifying organic additive to consume a significant amount of free radicals.

The preferred olefin polymers are ethylene-olefin copolymers, chlorinated polyethylenes, atactic polypropylene and the like.

It is preferred that the olefin polymer provide a pendant olefinic group, preferably an acrylate or methacrylate formed by reacting of a functional group such as an amide, an amine, a carboxyl or an anhydride group provided by a precursor olefin polymer. The presently preferred ethylene olefin polymers are acrylated or methacrylated random ethylene-propylene copolymers and ethylene-propylene terpolymers where the termonomer is a nonconjugated diene such as 5-ethylidene-2-norbornene 1,8 octadiene, 1,4 hexadiene, dicyclopentadiene and the like.

DETAILED DESCRIPTION

The present invention is directed to novel, crosslinked, pressure-sensitive adhesive compositions formed from free radical crosslinkable olefin polymers, preferably olefin polymers providing at least one pendant olefinally unsaturated group and a compatible tackifying organic additive. The mixture upon cure forms a pressure-sensitive adhesive which exhibits excellent adhesion to low-energy surfaces such as automotive paints and excellent weatherability. Such compositions are ideally used for double-coated tapes for automotive applications.

By the term "free radical crosslinkable olefin polymers" as used herein, there is meant polymers based on one or more olefin monomers which contain from 2 to about 4 carbon atoms and which provide one or more functional moieties which enable a free radical crosslinking reaction to occur by radiation, thermal or chemical processes. The functional moiety may be part of the polymer chain such as a halogen group, an unsaturated group or the like and/or a pendant group which functionally enables crosslinking reactions to occur. The preferred pendant group are olefinically unsaturated groups as formed by reaction of a group provided by a olefin polymer precursor with an olefinically unsaturated reactant. Such groups include amine, amide, carboxyl, anhydride groups and the like.

Illustrative, but not limiting, of the crosslinkable olefin polymers there may be mentioned ethylene-olefin copolymers and terpolymers, chlorinated polyethylene, atactic polypropylene and the like.

The invention also contemplates thermochemical cure with metallic ions such as aluminum Al+++, Cr+++ and the like and thermal initiators such as using peroxy free radical generators.

The ethylene olefin polymers which may be, and are preferably, used in the instant invention are random copolymers such as ethylene-propylene copolymers and terpolymers of ethylene, propylene and nonconjugated dienes such as 5-ethylidene-2-norbornene, 1,8 octadiene, 1,4 hexadiene, dicyclopentadiene and the like, and mixtures thereof. They may contain, depending on the feed stock, other polymerized olefins.

The presently preferred olefin polymers provide groups having olefinic unsaturation in consequence of reaction of an available anhydride group, whether pendant from or part of the backbone of the polymer and include maleated ethylene-propylene copolymers and maleated ethylene-propylene-conjugated diene terpolymers available from Exxon Chemical Co. under the Exxelor trademark. By the term "maleated" there is meant a cyclic anhydride group provided by the polymer. Anhydride groups provided by such polymers are preferably reacted with an unsaturated reactant such as hydroxy alkyl acrylates and/or methacrylates wherein the alkyl group contains from 2 to about 6 carbon atoms, preferably two carbon atoms. Reaction occurs in the presence of a catalyst such as dimethyl benzylamine at an elevated temperature, e.g., 100°–150° C. Reaction provides a polymer having as part of the backbone or pendant therefrom, an olefinically unsaturated group of the general formula:

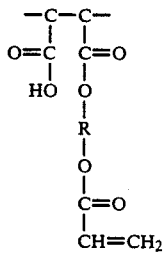

where R is an alkyl group of the formula —[CH$_2$]—$_n$ where n is from 2 to about 6.

Chemical reaction can be carried out with the hydroxy alkyl acrylate or methacrylate directly or after conversion to the acid with glycidyl acrylates and the like. Chemical reaction involving esterification of the anhydride is the preferred approach and can be carried out in bulk or hot melt or a solvent. Suitable reaction temperatures range from about 100° to about 150° C., typically from about 120° to about 130° C. As indicated, although the reaction can be effectively carried out under hot melt conditions, the solvent reaction is currently believed to be the most efficient means of achieving the reaction.

Reaction can occur prior to or following addition of the second component of the instant invention. The second component is a tackifying organic additive which is compatible with the olefin polymer by being dispersable in and preferably soluble in the olefin polymer.

Properties of the pressure-sensitive adhesive composition are, as indicated, enhanced by free radical cure, with free radicals preferably generated by electron beam (EB) radiation, or actinic radiation, such as ultraviolet (UV) radiation, with or without photoinitiators and/or photosensitizers.

Cure overcomes the major deficiency of pressure-sensitive adhesives based on saturated polymers, namely, to provide acceptable elevated temperature cohesive strength.

There may also be employed as part of the system external crosslinkers. Crosslinkers include multifunctional monomers such as acrylates, methacrylates, and polythiols. As they are thermally reactive, care must be taken to avoid premature crosslinking independent of the ultimate means of cure.

The olefin based copolymers are not inherently pressure-sensitive adhesives and pressure-sensitive adhesive properties are induced by the addition of a compatible organic additive which serves as a tackifier. Tackifiers are resins which serve to increase glass transition temperature of the polymer.

Although any compatible tackifier may be used, the preferred tackifying organic additives are substantially hydrogenated. By the term "substantially hydrogenated" there is meant that if the additive is aromatic, it should effectively be at least 50%, preferably at least 60%, saturated and if aliphatic, at least 65%, preferably 80%, of unsaturated groups in the organic additive as provided should be saturated or otherwise rendered nonresponsive to the action of free radicals. Complete or substantial hydrogenation is preferred, or at least saturation by hydrogenation, to a level where inclusion of the tackifier will involve a negligible consumption of free radicals over that required to achieve polymer cure.

As specific hydrogenated organic additive tackifiers employed in the practice of the invention, there may be mentioned hydrogenated styrene based resins such as Regalrez ™ resins designated as 1018, 1033, 1065, 1078, 1094 and 1126 manufactured and sold by Hercules, Inc.; Regalrez ™ 6108 a 60% hydrogenated aromatic resin, also manufactured by Hercules; hydrogenated C$_5$ and-/or C$_9$ hydrocarbon feed stocks such as Arkon ™ P-70, P-90, P-100, P-125, P115, M-90, M-100, M-110 and M-120 resins manufactured and sold by Arakawa Chemical and Regalite ™ R-100, MGB-63, MGB-67, MGB-70, resins manufactured and sold by Hercules, Inc.; hydrogenated polycyclo-pentadienes such as Escorez ™ 5320, 5300 and 5380 resins manufactured and sold by Exxon Chemical, hydrogenated polyterpene and other naturally occurring resins such as Clearon ™ P-105, P-115, P-125, M-105, and M-115 manufactured and sold by Yasuhara Yushi Kogyo Co. Ltd. of Japan and Eastotack ™ H-100, H-115 and H-130 resins manufactured and sold by Eastman chemical and the like.

Organic additives which serve a tackifying function are normally present in a concentration ranging from about 40% to about 90% by weight, preferably from about 45% to about 85% by weight of the mixture of total olefin polymer and tackifying organic additive. Compositions containing less than about 40% by weight of an organic tackifier typically do not have sufficient "quickstick" or initial grab and compositions having too high a tackifying organic additive have too low a cohesive strength even when crosslinked.

As examples of other useful nontackifying organic additives which are substantially nonresponsive to free radicals there may be mentioned compatible hydrogenated organic compounds, such as hydrogenated aromatic resins including hydrogenated polystyrene, polyalpha-methyl -styrene, polyvinyl toluene, copolymers of styrene with other monomers and the like; hydrogenated aliphatic resins derived from petroleum based products; highly hydrogenated rosins and rosin esters; hydrogenated white oil, mineral oil such as Kaydol oil made by Witco and the like.

The compositions of the instant invention may be and normally are made up of components (unsaturated elastomeric polymer and organic additives) having multiple glass transition temperatures. To be functional as a pressure sensitive adhesive the composition must have at least one glass transition temperature which is at least about 10° C. below use temperatures, preferably at least 20° C. below use temperatures.

The presently preferred cured composition at a coat weight of about 125 g/m$^2$ provides in respect to a stainless steel substrate a 180° peel in excess of about 700 N/m and a SAFT of at least about 75° C.

There may also be incorporated in the compositions of this invention other property modifiers such as fillers, short fibers, pigments, plasticizers, oils, and the like.

The pressure-sensitive adhesives of the instant invention exhibit superior adhesive properties and weatherability, and because of being based on low-surface energy polymers, namely olefin polymers, may exhibit unusual adhesion to low energy surfaces such as automotive paints and the like. They are, as such, ideally suited as skin adhesives for conforming tapes, particularly where the adhesive is to come in contact with a painted surface. Such adhesive tapes consist of a core and different pressure sensitive adhesive skin layers on each side of the core. The material of the skin adhesive may be the same as the core or different from the core. The core is capable of conforming to irregularities of the substrate and is normally filled with materials such as fumed silica, carbon black, microspheres or microballoons whether solid or hollow including but not limited to glass microballoons, phenolic microballoons, and ceramic microballoons. The core may be cured with or separately from the skin.

These and other applications will become apparent to the reader with reference to the following Examples.

EXAMPLE 1 AND CONTROL 1

Two hundred forty grams of a maleated ethylene-propylene polymer (EPR) known as Exxelor VA 1803 (manufactured by Exxon Chemical Co.) was blended with 360 g of Regalrez 1078 and 100 g of Regalrez 1033 (each manufactured by Hercules, Inc.) in a Z-blade mixer at a temperature of 165° C. for 3 hours. Temperature was then reduced to 125° C. and 6 g of 2-hydroxy ethyl acrylate (2HEA) and 0.6 grams of dimethyl benzylamine (DMBA) catalyst and 0.1 g of Santanox R antioxidant were added and reacted for one hour. One hundred eighty grams of this mixture was dispersed in 420 g. of heptane. The dispersion was knife coated on Supertuf release liner and dried at 70° C. for 15 minutes to give a coat weight of 129.4 g/sq.m. This film was then EB cured at 50 and 80 kGy dose under nitrogen. Control 1 was the same composition but without EB cure. Adhesive composition was as follows:

| | |
|---|---|
| Exxcelor VA 1803 | 34 wt % |
| Regalrez 1078 | 51 wt % |
| Regalrez 1033 | 14 wt % |
| 2-HEA | 0.90 wt % |
| DMBA | 0.08 wt % |
| Santanox R | 0.01 wt % |

180° peel adhesion was measured by laminating the tape to 2 mil Mylar and carrying out the adhesion test similar to PSTC-1 on stainless steel, polyethylene and polypropylene substrates. The loop tack was measured using stainless steel as substrate. The shear holding power was tested using PSTC-7 modified by using the overlap area and loads shown in the Table 1.

Shear adhesion failure temperature was determined by laminating the tape on 2 mil soft aluminum foil, cutting a 5.08 cm×2.54 cm segment from the tape and laminating the adhesive side to the panel to give a 2.54 cm×1.25 cm overlap with 2.54 cm length overhanging from the panel. After positioning the tape in the oven for 20 minutes at room temperature, a 1 Kg load is attached at the free end of the tape and the temperature is increased 0.5° C. per minute up to 200° C. maximum. The temperature at which the tape fails is recorded as the SAFT.

Since the polymer is substantially saturated it should show excellent aging comparable to polyethylene and polypropylene and hence could be useful for outdoor applications and where adhesion to polyolefins is important. The cured tape was also found to be substantially insoluble in most organic solvents including tetrahydrofuran (THF).

TABLE 1

PERFORMANCE OF TRANSFER TAPES BASED ON MODIFIED MALEATED ETHYLENE PROPYLENE RUBBERS (EXXCELOR VA 1803)

| Adhesive | Con. 1 | Ex. 1 | Ex. 2 |
|---|---|---|---|
| Coat weight (g/sq · m) | 129 | 129 | 129 |
| E.B. Dose (kGy) | 0 | 50 | 80 |
| Face Material | Mylar | Mylar | Mylar |
| 180° Peel Adhesion (N/m) 20 minute dwell, Stainless Steel. | 1854 | 1538 | 1477 |
| 180° Peel Adhesion (N/m) 20 minute dwell, Polyethylene. | 1220 | 907 | 874 |
| 180° Peel Adhesion (N/m) 20 minute dwell, Polypropylene. | 1122 | 753 | 1177 |
| Loop Tack (N/m) | 1670 | 2840 | 1821 |
| SAFT (°C.), Al | 65 | 124 | 107 |
| 70° C. Shear, 1 Kg (min.) 2.54 cm × 1.27 cm. | 2 | 21 | 22 |
| RT Shear, 1 Kg (min.) 2.54 cm × 1.27 cm. | 193 | 7000+ | 7000+ |

EXAMPLES 3 TO 6 AND CONTROLS 2 AND 3

240 grams of an ethylene propylene polymer known as Exxelor VA 1803 was blended with 360 g of Regalrez 1078 in a Z-blade mixer at 165° C. for 2.5 hours. Temperature was reduced to 125° C. and 6 g of 2-HEA, 0.6 g of DMBA and 6 g of Irgacure 651 were added and mixture reacted for 20 minutes. A portion of this material was dispersed in 225 g of heptane. The dispersion was knife coated on Supertuf release liner and at 70° C. for 15 minutes to give a coat weight of 31 g/sq.m and another 37 g/sq.m. The tapes with 31 g/sq.m coat weight adhesive film was EB cured and the tape with 37 g/sq.m coat was UV cured both under nitrogen. The dosage used and tape properties are shown in Table 2.

TABLE 2

| | Con 2 | Ex 3 | Ex 4 | Con 3 | Ex 5 | Ex 6 |
|---|---|---|---|---|---|---|
| Adhesive | — | (EB) | (EB) | — | (UV) | (UV) |
| Coat weight (g/sq·m) | 31 | 31 | 31 | 37 | 37 | 37 |
| (EB)/(UV Dose)(KGy)/ (kJ/sq·m) | 0 | 20 | 50 | 0 | 2.4 | 5.8 |
| Face Material | Al | Al | Al | Al | Al | Al |
| 180° Peel Adhesion (N/m) 20 minute dwell, Stainless Steel | 1054 | 1054 | 967 | 1284 | 1077 | 1034 |
| SAFT (°C.), Al 2.54 cm × 1.27 cm, 1 Kg | 68 | 93 | 105 | 78 | 105 | 98 |

EXAMPLE 7

250 gms. of a composition of Example 1 was mixed with 5.36 gms. of Cab-O-Sil TS-720 from Cabot Corporation and 36.1 gms. of ceramic microballoons from PA Industries and mixed in a Z-blade mixer. The mixture was cast into a core having a thickness of 35 mils and unmodified composition of Example 1 were provided to the cure as opposed skin layers at an adhesive loading of 106 gms. per meter square each. Upon cure, an EB cure 180° peel dwell to stainless steel (20 min. dwell) was 4200 N/m and to a Inmont base coat—clear coat painted panel of 2,980 N/m.

What is claimed is:

1. A pressure-sensitive adhesive comprising a free radical cured mixture of at least one olefin polymer selected from the group consisting of ethylene-containing olefin copolymers, ethylene-containing olefin terpolymers, chlorinated polyethylene and atactic polypropylene, said olefin polymer having pendant therefrom an olefinically unsaturated group of the formula:

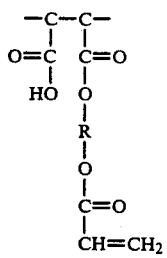

where R is an alkyl group of the formula $-(CH_2)_n-$ where n is from 2 to about 6;
and at least one tackifier which is compatible with said polymer and increases the glass transition temperature of said polymer, said tackifier being present in an amount sufficient to tackify the cured mixture, said mixture being cured by actinic or electron beam radiation, and having a glass transition temperature of at least 10° C. below use temperature.

2. A pressure-sensitive adhesive as claimed in claim 1 in which the tackifier is provided in a concentration of from about 40 to about 90 per cent by weight based on the total weight of the olefin polymer and tackifier.

3. A pressure-sensitive adhesive as claimed in claim 1 in which the tackifier is present in a concentration of about 45 to 85 percent by weight based on the weight of the olefin polymer and tackifier.

4. A pressure-sensitive adhesive as claimed in claim 1 in which a crosslinking agent is present during free radical cure of the mixture.

5. A pressure-sensitive adhesive as claimed in claim 4 in which the crosslinking agent is selected from the group consisting of multifunctional acrylates, multifunctional methacrylates and polythiols.

6. A pressure-sensitive adhesive as claimed in claim 1 in which the tackifier is selected from the group consisting of saturated aliphatic resins, saturated aromatic resins and mixtures thereof.

7. A pressure-sensitive adhesive as claimed in claim 1 in which the tackifier is a substantially hydrogenated resin.

8. A pressure-sensitive adhesive comprising a free radical cured mixture of at least one free radical cured alpha olefin polymer selected from the group consisting of ethylene-containing copolymers, ethylene-containing terpolymers, chlorinated polyethylene and atactic polypropylene, said olefin polymer providing at least one olefinically unsaturated pendant group of the formula:

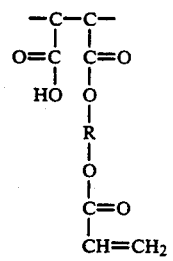

where R is an alkyl group of the formula $-(CH_2)-_n$ and n is from 2 to about 6;
and at least one tackifier which increases the glass transition temperature of the polymer and which is at least dispersible in said polymer and present in an amount sufficient to tackify the cured mixture, said mixture being cured by actinic or electron beam radiation, having a glass transition temperature at least 10° C. below use temperature and at a cost weight of 125 g/m² having a 180° peel to a stainless steel substrate in excess of about 700 N/m and a SAFT of at least about 75° C.

9. A pressure-sensitive adhesive as claimed in claim 8 in which the tackifier is provided in a concentration of from about 40 to 90 per cent by weight based on the total weight of the olefin polymer and tackifier.

10. A pressure-sensitive adhesive as claimed in claim 8 in which the tackifier is present in a concentration of about 45 to about 85 percent by weight based on the weight of the olefin polymer and tackifier.

11. A pressure-sensitive adhesive as claimed in claim 8 in which a crosslinking agent is present during free radical cure of the mixture.

12. A pressure-sensitive adhesive as claimed in claim 11 in which the crosslinking agent is selected from the group consisting of multifunctional acrylates, multifunctional methacrylates and polythiols.

13. A pressure-sensitive adhesive as claimed in claim 8 in which the tackifier is selected from the group consisting of saturated aliphatic resins, saturated aromatic resins and mixtures thereof.

14. A pressure-sensitive adhesive as claimed in claim 8 in which the tackifier is a substantially hydrogenated resin.

15. A pressure-sensitive adhesive as claimed in claim 10 in which the tackifier is selected from the group consisting of saturated aliphatic resins, saturated aromatic resins and mixtures thereof.

16. A pressure-sensitive adhesive as claimed in claim 10 in which the tackifier is a substantially hydrogenated resin.

17. A pressure-sensitive adhesive comprising a free radical cured mixture of free radical cross-linkable ethylene olefin polymer(s) selected from the group consisting of ethylene-propylene copolymers, ethylene-propylene-nonconjugated diene terpolymers and mixtures thereof, the copolymer providing at least one olefinically unsaturated pendant groups of the formula:

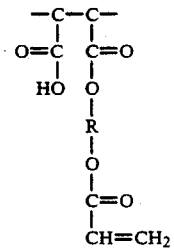

where R is an alkyl group of the formula $-(CH_2)_n-$ where n is from 2 to about 6;

and at least one hydrogenated tackifier which increases the glass transition temperature of the polymer and which is at least compatible in said polymer and present in a total amount of from about 40 to about 90 percent by weight based on the total weight of polymer and tackifier and sufficient to tackify the cured mixture of tackifier and polymer, said mixture being cured by actinic or electron beam radiation, having a glass transition temperature at least 10° C. below use temperature, said pressure sensitive adhesive having at a coat weight of 125 g/m² a 180° peel to stainless steel in excess of 700 N/m and a SAFT of at least about 75° C.

18. A pressure-sensitive adhesive as claimed in claim 17 in which the tackifier is present in a concentration of about 45 to about 85 percent by weight based on the weight of the polymer and tackifier.

19. A pressure-sensitive adhesive as claimed in claim 17 in which a crosslinking agent is present during free radical cure of the mixture.

20. A pressure-sensitive adhesive as claimed in claim 19 in which the crosslinking agent is selected from the group consisting of multifunctional acrylates, multifunctional methacrylates and polythiols.

21. A pressure-sensitive adhesive as claimed in claim 17 in which the tackifier is a hydrogenated tackifier selected from the group consisting of saturated aliphatic resins, saturated aromatic resins and mixtures thereof.

22. A pressure-sensitive adhesive as claimed in claim 23 in which the tackifier is a hydrogenated tackifier selected from the group consisting of saturated aliphatic resins, saturated aromatic resins and mixtures thereof.

23. A pressure-sensitive adhesive as claimed in claim 17 where the tackifier is a substantially hydrogenated resin.

24. A pressure-sensitive adhesive comprising a free radical cured mixture of at least one free radical curable ethylene olefin polymer selected from the group consisting of ethylene-propylene copolymers, ethylene-propylene-nonconjugated diene terpolymers, and mixtures thereof, said polymer providing at least one olefinically unsaturated pendant group and formed by reaction of anhydride group of a precursor of the polymer with a reactant selected from the group consisting of hydroxyalkyl acrylates and hydroxyalkyl methacrylate in which the alkyl group contains 2 carbon atoms and at least one tackifier which increases the glass transition temperature of the polymer and which is at least dispersible in the polymer and present in a total amount of from 40% to about 90% by weight of the tackifier and polymer and sufficient to tackify the cured mixture of tackifier and polymer, said mixture being cured by actinic or electron beam radiation, having a glass transition temperature of at least 10° C. below use temperature and at a coat weight of about 125 g/m² providing to stainless steel a 180° peel adhesion of at least about 700 N/m and a SAFT of at least about 75° C.

25. A pressure-sensitive adhesive as claimed in claim 24 where the tackifier is a substantially hydrogenated resin.

* * * * *

UNITED STATES PATENT AND TRADEMARK OFFICE
CERTIFICATE OF CORRECTION

PATENT NO. : 5,244,962         Page 1 of 2
DATED      : September 14, 1993
INVENTOR(S): Sebastian S. Plamthottam; Roger H. Mann; John O. Landers It is certified that error appears in the above-indentified patent and that said Letters Patent is hereby corrected as shown below:

Column 2, line 30, change "reacting" to -- reaction --.
Column 2, lines 44,45, change "olefinally" to
         -- olefinically --.
Column 2, line 63, after "provided by" change a"
         to -- an --.

Column 3, line 47, change "—[CH$_2$]—$_n$" to -- —[CH$_2$]$_n$— --.
Column 3, line 52, change "the-preferred" to
         -- the preferred --.

Column 4, line 43, change "P115" to -- P-115 --.
Column 4, line 54, change "Eastman chemical" to
         -- Eastman Chemical --.

Column 5, line 57, change "420 g." to -- 420 g --.
Column 5, line 59, change "g/sq.m" to -- g/m$^2$ --.

Column 6, line 37, in Table 1 change "(g/sq · m)"
         to -- (g/m$^2$) --.

Column 7, lines 1,2,4, change "g/sq.m" to -- g/m$^2$ --
         (all occurrences).
Column 7, line 11, in Table 2 change "(g/sq · m)"
         to -- (g/m$^2$) --.
Column 7, line 14, in Table 2 change (kJ/sq · m)
         to -- (kJ/m$^2$) --.
Column 7, line 30, before "unmodified" insert -- the --.
Column 7, line 33, change "square" to -- squared --.

UNITED STATES PATENT AND TRADEMARK OFFICE
CERTIFICATE OF CORRECTION

PATENT NO. : 5,244,962

DATED : September 14, 1993

INVENTOR(S) : Sebastian S. Plamthottam; Roger H. Mann; John O. Landers

It is certified that error appears in the above-indentified patent and that said Letters Patent is hereby corrected as shown below:

Column 8, line 1, change "per cent" to -- percent --.
Column 8, lines 22,23, delete "free radical cured".
Column 8, line 41, change "—[CH$_2$]—$_n$" to -- —[CH$_2$]$_n$— --.
Column 8, line 49, change "cost" to -- coat --.
Column 8, line 55, change "per cent" to -- percent --.

Column 10, line 19, change "23" to -- 17 --.

Signed and Sealed this

Twelfth Day of July, 1994

Attest:

BRUCE LEHMAN

Attesting Officer

Commissioner of Patents and Trademarks